United States Patent
Inokuchi et al.

(10) Patent No.: US 9,917,982 B2
(45) Date of Patent: Mar. 13, 2018

(54) IMAGE READING APPARATUS CREATING SHADE CORRECTION DATA BASED ON INTERMEDIATE SHADE DATA AND SENSING A REFERENCE MEMBER A PLURALITY OF TIMES

(71) Applicant: Panasonic Intellectual Property Management Co., Ltd., Osaka (JP)

(72) Inventors: Katsuo Inokuchi, Fukuoka (JP); Hirotsugu Fusayasu, Kyoto (JP); Ryo Matsubara, Osaka (JP); Tatsuya Hirota, Fukuoka (JP); Yuuichi Tutiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/375,943

(22) Filed: Dec. 12, 2016

(65) Prior Publication Data
US 2017/0094114 A1    Mar. 30, 2017

Related U.S. Application Data

(63) Continuation of application No. PCT/JP2016/000856, filed on Feb. 18, 2016.

(30) Foreign Application Priority Data

Mar. 26, 2015  (JP) ................................. 2015-065074

(51) Int. Cl.
*H04N 1/00* (2006.01)
*H04N 1/40* (2006.01)
(Continued)

(52) U.S. Cl.
CPC ......... *H04N 1/401* (2013.01); *H04N 1/00005* (2013.01); *H04N 1/00013* (2013.01);
(Continued)

(58) Field of Classification Search
CPC .... H04N 1/028; H04N 1/02885; H04N 1/047; H04N 1/125; H04N 1/40; H04N 1/40006;
(Continued)

(56) References Cited

U.S. PATENT DOCUMENTS

| | | | |
|---|---|---|---|
| 4,974,072 | A | 11/1990 | Hasegawa |
| 5,206,501 | A | 4/1993 | Sakakibara et al. |

(Continued)

FOREIGN PATENT DOCUMENTS

| | | |
|---|---|---|
| JP | 1-101061 | 4/1989 |
| JP | 2-254867 | 10/1990 |

(Continued)

OTHER PUBLICATIONS

International Search Report of PCT application No. PCT/JP2016/000856 dated Apr. 19, 2016.

*Primary Examiner* — Scott A Rogers
(74) *Attorney, Agent, or Firm* — McDermott Will & Emery LLP

(57) ABSTRACT

An image reading apparatus includes: a sensor module which includes a light source and sensors; a reference member for creating black correction data and white correction data; and an image processor. The image processor corrects uneven density of an image resulting from interference of image signals from the sensors, by performing, on the image signals obtained by the sensors, shading correction using black correction data and white correction data. The image processor obtains causes the sensors to obtain image signals of the reference member, and creates the white correction data based on white data, and the black correction (Continued)

data based on intermediate data. At least one of when creating the white correction data and when creating the black correction data, the image processor causes the sensors to obtain image signals of the reference member a plurality of times.

10 Claims, 17 Drawing Sheets

(51) Int. Cl.
*H04N 1/401* (2006.01)
*H04N 1/12* (2006.01)
*H04N 1/191* (2006.01)
*H04N 1/193* (2006.01)

(52) U.S. Cl.
CPC ..... *H04N 1/00018* (2013.01); *H04N 1/00034* (2013.01); *H04N 1/00039* (2013.01); *H04N 1/00045* (2013.01); *H04N 1/00053* (2013.01); *H04N 1/00063* (2013.01); *H04N 1/00068* (2013.01); *H04N 1/00082* (2013.01); *H04N 1/00087* (2013.01); *H04N 1/12* (2013.01); *H04N 1/125* (2013.01); *H04N 1/191* (2013.01); *H04N 1/193* (2013.01); *H04N 1/40006* (2013.01); *H04N 2201/0081* (2013.01); *H04N 2201/0094* (2013.01)

(58) Field of Classification Search
CPC ...... H04N 1/401; H04N 1/407; H04N 1/6027; H04N 1/00002; H04N 1/00013; H04N 1/00018; H04N 1/00034; H04N 1/00039; H04N 1/00045; H04N 1/0005; H04N 1/00053; H04N 1/00063; H04N 1/00068; H04N 1/00082; H04N 1/00087
See application file for complete search history.

(56) References Cited

U.S. PATENT DOCUMENTS

| | | | |
|---|---|---|---|
| 8,390,900 B2* | 3/2013 | Sakane | H04N 1/00002 358/461 |
| 2003/0072497 A1 | 4/2003 | Hiromatsu | |
| 2005/0206968 A1 | 9/2005 | Sodeura et al. | |
| 2008/0055668 A1 | 3/2008 | Hirayama | |
| 2008/0204782 A1 | 8/2008 | Hiromatsu | |
| 2008/0204820 A1 | 8/2008 | Ito | |
| 2017/0054872 A1* | 2/2017 | Fusayasu | H04N 1/19 |
| 2017/0078527 A1* | 3/2017 | Fusayasu | H04N 1/19 |
| 2017/0134613 A1* | 5/2017 | Matsubara | H04N 1/401 |
| 2017/0214827 A1* | 7/2017 | Sasaki | H04N 1/00801 |

FOREIGN PATENT DOCUMENTS

| | | |
|---|---|---|
| JP | 3-007466 | 1/1991 |
| JP | 5-063978 | 3/1993 |
| JP | 8-098017 | 4/1996 |
| JP | 11-098329 | 4/1999 |
| JP | 2003-198813 | 7/2003 |
| JP | 2005-269545 | 9/2005 |
| JP | 2008-060975 | 3/2008 |
| JP | 5007133 B | 8/2012 |

* cited by examiner

IMAGE READING APPARATUS CREATING SHADE CORRECTION DATA BASED ON INTERMEDIATE SHADE DATA AND SENSING A REFERENCE MEMBER A PLURALITY OF TIMES

BACKGROUND

1. Technical Field

The present disclosure relates to an image reading apparatus which reads an image on an object.

2. Description of the Related Art

Japanese Unexamined Patent Application Publication 2008-060975 discloses an image reading apparatus which includes a white reference plate, and obtains white reference data from the output of a sensor when the sensor obtains an image of the white reference plate while a light source is emitting light, and also obtains black reference data from the output of the sensor while the light source is emitting no light. The image reading apparatus performs shading correction based on the white reference data and the black reference data thus obtained.

SUMMARY

An image reading apparatus according to the present disclosure includes: a sensor module which includes a light source which irradiates an object with light, and sensors which read reflected light of the light with which the object is irradiated to obtain image signals; and a data creator which creates black correction data to be used as a black reference in shading correction and white correction data to be used as a white reference in the shading correction. The image reading apparatus further includes: a reference member for creating the black correction data and the white correction data, the reference member extending in a main-scanning direction predetermined; and a corrector which corrects uneven density of an image resulting from interference of the image signals from the sensors, by performing, on the image signals obtained by the sensors, the shading correction using the black correction data and the white correction data.

The sensors are disposed in the main-scanning direction, and configured such that the image signals obtained by the sensors form a one-line image signal in the main-scanning direction. The data creator is configured to obtain white data by causing the sensors to obtain image signals of the reference member, and create the white correction data based on the white data. Also, the data creator is configured to obtain intermediate data which has a level of shade lighter than a level of shade of the black reference and darker than a level of shade of the white reference by causing the sensors to obtain image signals of the reference member, and create the black correction data based on the intermediate data. At least one of when creating the white correction data and when creating the black correction data, the data creator causes the sensors to obtain image signals of the reference member a plurality of times.

This configuration stably reduces density unevenness of an image caused by output from sensors interfering one another.

DETAILED DESCRIPTION

The following describes an embodiment in detail, with reference to the drawings as appropriate. However, an unnecessarily detailed description may be omitted. For example, a detailed description of a matter already known well and a redundant description of substantially the same configuration may be omitted. This is intended to avoid making the following description unnecessarily redundant and to facilitate understanding of a person skilled in the art.

Note that the inventors provide the accompanying drawings and the following description in order that persons skilled in the art sufficiently understand the present disclosure, and do not intend to limit the disclosed subject matter of the claims by these.

BACKGROUND OF DISCLOSURE

In an image reading apparatus, such as a scanner, which reads an original to create image data, distortion dependent on pixel positions is caused by variations in light receiving elements of a sensor module such as charge coupled devices (CCDs) and contact image sensors (CISs), a difference in concentration between a center portion and a peripheral portion of a lens, and uneven distribution of amounts of light from a light source.

To address this, an image reading apparatus which performs shading correction on obtained image data has been known. An image forming apparatus such as a multifunction peripheral or a copying machine which includes such an image reading apparatus has also been known.

With a configuration in which a plurality of sensors are disposed in a main-scanning direction, and forms a one-line image signal extending in the main-scanning direction and including image signals obtained by the sensors, uneven density of an image may appear due to the interference of output from the sensors. Such uneven density cannot be sufficiently corrected only by shading correction.

In a configuration in which a scanner unit is connected to a controller via a flexible flat cable (FFC), if the scanner unit moves at high speed, the position of the FFC which is a transmission line for image signals varies, and the amount of interference of output from the sensors varies. Furthermore, also the above amounts of interference may be different depending on the times when the sensors read an image, since the FFC keeps vibrating for a while even after the scanner unit is stopped after moving at high speed.

In view of this, in order to solve such a problem, the present disclosure provides an image reading apparatus which reduces density unevenness of an image resulting from the interference of output from sensors.

Embodiment 1

The following describes an exemplary embodiment in detail, with reference to the drawings.

[1. Configuration]
[1-1. Multifunction Peripheral]

Figure 1:
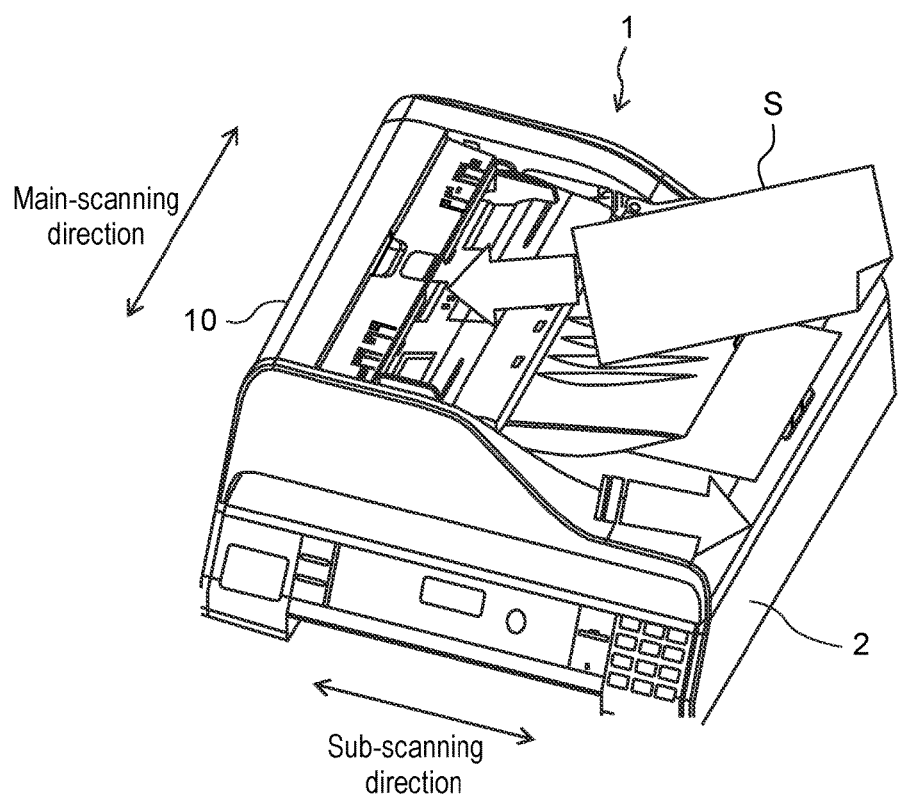
FIG. 1 is a perspective view of a multifunction peripheral according to Embodiment 1.
Figure 2:
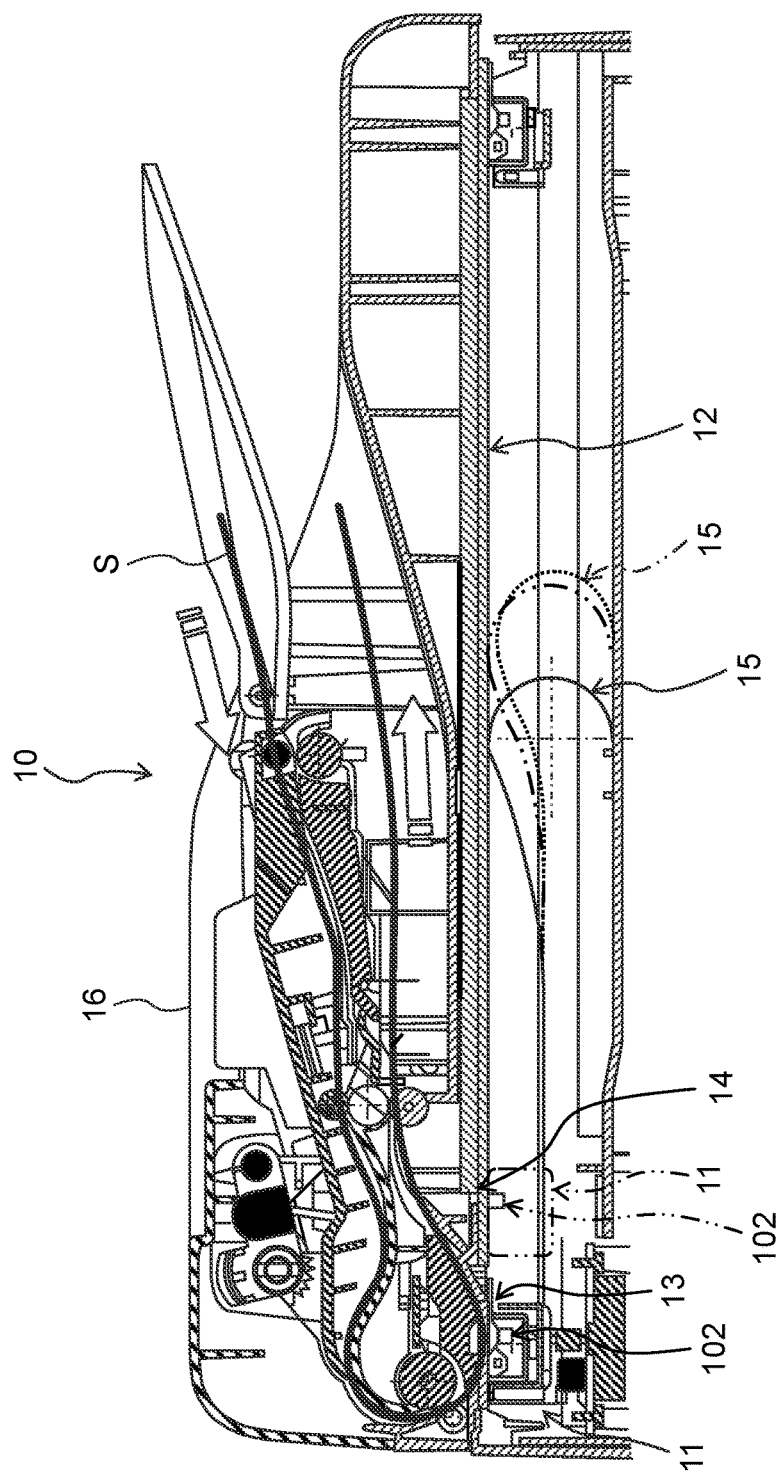
FIG. 2 is a cross-sectional view of the multifunction peripheral according to Embodiment 1.

A description of a hardware configuration of multifunction peripheral 1 which includes image reading apparatus 10 according to Embodiment 1 is given with reference to FIGS. 1 and 2. FIG. 1 is a perspective view of multifunction peripheral 1 according to Embodiment 1. FIG. 2 is a cross-sectional view of the multifunction peripheral 1 according to Embodiment 1.

Multifunction peripheral 1 includes main unit 2 and image reading apparatus 10 disposed on main unit 2. In addition to the scanning function of image reading apparatus 10, multifunction peripheral 1 has other functions (such as, for example, a printing function, a copying function, and a facsimile transmitting/receiving function). Main unit 2 has a configuration according to the functions of multifunction peripheral 1.

As illustrated in FIGS. 1 and 2, image reading apparatus 10 is a flatbed (FB) image scanner. Image reading apparatus 10 includes scanner unit 11, FB glass 12, automatic document feeder (ADF) glass 13, reference member 14, ADF 16, and controller 100 (see FIG. 5).

FB glass 12 and ADF glass 13 are provided on the upper surface of main unit 2. FB glass 12 covers most of the upper surface of main unit 2. Original S which is to be read is placed on FB glass 12. ADF glass 13 is for reading original S fed by ADF 16.

ADF 16 is disposed above main unit 2, covering FB glass 12 and ADF glass 13. ADF 16 automatically supplies original S.

Scanner unit 11 is configured to move inside main unit 2, along the back surface of FB glass 12 and the back surface of ADF glass 13. The directions in which scanner unit 11 moves are referred to as sub-scanning directions. FB glass 12 and ADF glass 13 are disposed in a sub-scanning direction.

Scanner unit 11 obtains an image to be read. Scanner unit 11 is driven by a motor (omitted from the illustration), and moves in the sub-scanning directions along a guide (omitted from the illustration). The motor is controlled by controller 100. Scanner unit 11 is connected to controller 100 via FFC 15.

Reference member 14 is used in order to obtain data for correction. Reference member 14 is disposed above main unit 2, between FB glass 12 and ADF glass 13. Reference member 14 is disposed inward of main unit 2, that is, facing scanner unit 11.

FFC 15 is a communication cable having signal lines inside. FFC 15 has a sufficient length and flexibility so that scanner unit 11 can move smoothly within a range in which scanner unit 11 is allowed to move. Scanner unit 11 includes sensor module 102 (see FIG. 5).

Figure 3:
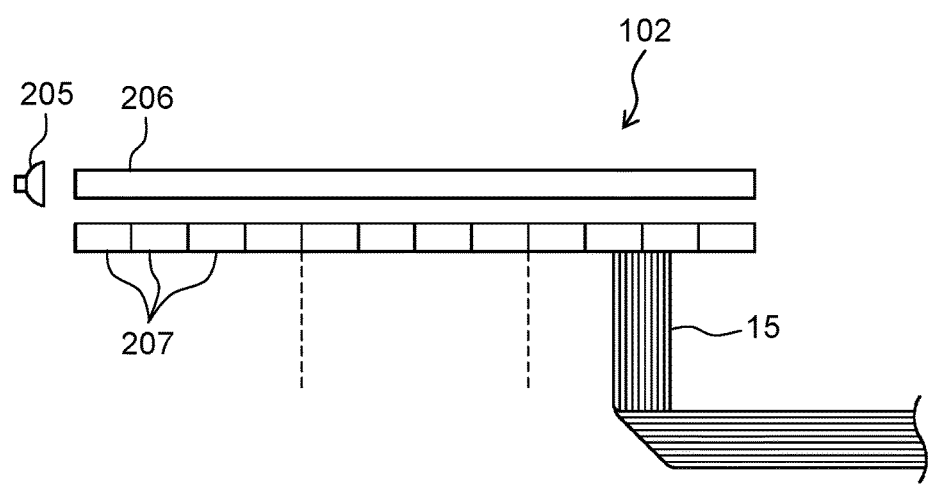
FIG. 3 is a schematic diagram of a sensor module according to Embodiment 1.

FIG. 3 is a schematic diagram of sensor module 102 according to Embodiment 1. In the present embodiment, sensor module 102 adopts a contact image sensor scheme, or in other words, sensor module 102 is a CIS type module. Sensor module 102 includes light source 205 and sensors 207.

Sensors 207 are disposed in a main-scanning direction orthogonal to the sub-scanning directions. Typically, sensor 207 is a sensor IC, and for example, is a CMOS image sensor. Each sensor 207 includes pixels (photoelectric converters) disposed in a main-scanning direction. A rod lens array (omitted from the illustration) is provided above sensors 207. Light concentrated by the rod lens array enters sensors 207.

Sensors 207 are divided into sectors, convert received light into image signals, and output the converted image signals sector-by-sector. In other words, a sector is a group of sensors 207 which output image signals at one time. For example, if twelve sensors 207 are included and divided into three sectors, each sector includes four sensors 207. Sensors 207 output image signals to controller 100 via FFC 15.

Light source 205 typically includes LEDs. For example, light source 205 includes three LEDs, namely, red (R), green (G), and blue (B) LEDs. Light source 205 is disposed in sensor module 102 at an end portion (left end in FIG. 3) in a main-scanning direction. Sensor module 102 includes light guide 206, and light source 205 emits light upward through light guide 206, that is, toward FB glass 12, ADF glass 13, and reference member 14. Light source 205 and light guide 206 are disposed in the vicinity of sensors 207, and thus light reflected off reference member 14 or an original on FB glass 12 or on ADF glass 13 enters sensors 207 through the rod lens array.

Figure 4:
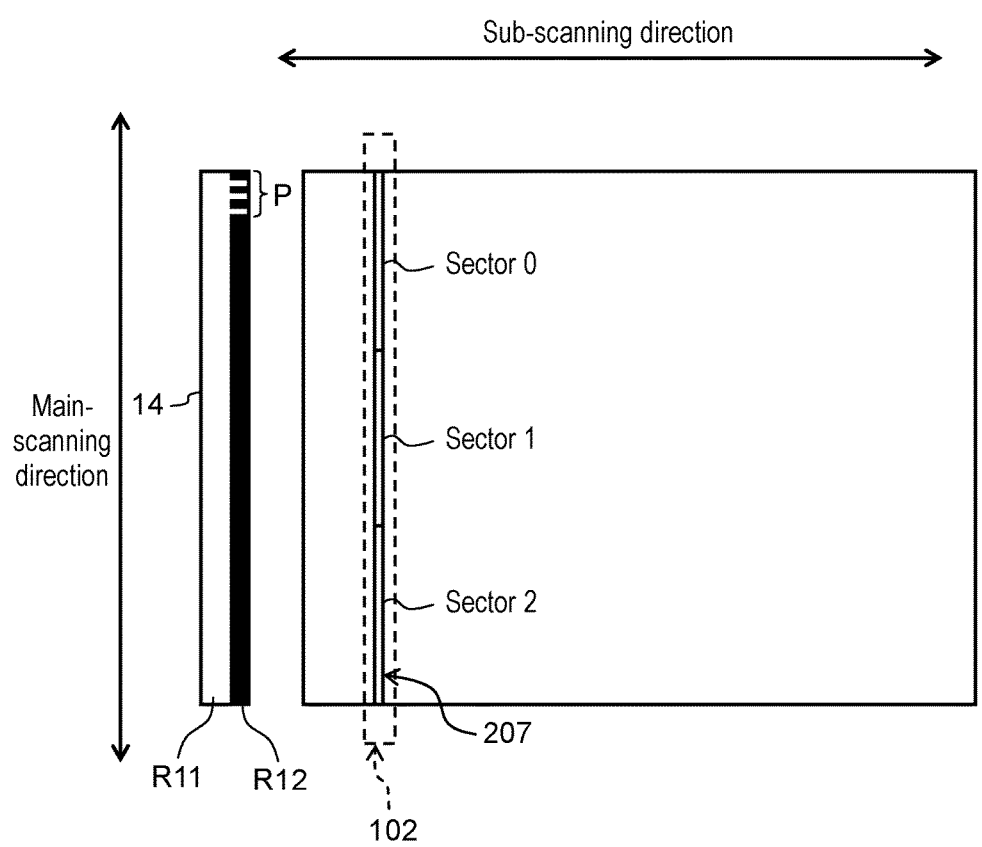
FIG. 4 is a schematic diagram of a reference member according to Embodiment 1.

FIG. 4 is a schematic diagram of reference member 14 according to Embodiment 1. Reference member 14 is a rectangular plate-shaped member in plan view. Reference member 14 extends in a main-scanning direction. The length of reference member 14 in a main-scanning direction is longer than at least the length of sensor module 102 (more specifically, a line of sensors 207).

Reference member 14 has, on at least one side facing sensor module 102, white region R11 and black region R12 extending along the entire length of sensor module 102 in a main-scanning direction (vertical direction in FIG. 4) and arranged in a sub-scanning direction (horizontal direction in FIG. 4). White region R11 has a white color throughout, and provides a white reference level for shading correction. Black region R12 provides a black reference level for shading correction. Furthermore, black region R12 has, at an end portion, reference pattern P which indicates a home position. More specifically, reference pattern P is included in black region R12 at a portion (which is a portion excluding start windows R21, R23, and R25 and end windows R22, R24, and R26 later described (see FIG. 11)) used when generating black shading data. Reference pattern P includes white lines extending in a sub-scanning direction and arranged in a main-scanning direction. Note that reference pattern P is not limited to the pattern illustrated in FIG. 4, and a given pattern can be adopted so long as image processor 204 identifies the pattern. The present embodiment shows an example in which reference pattern P is included in black region R12, but may be included in white region R11. For example, reference pattern P at an end portion of white region R11 may include black lines extending in a sub-scanning direction and arranged in a main-scanning direction.

[1-2. Image Reading Apparatus]

Figure 5:
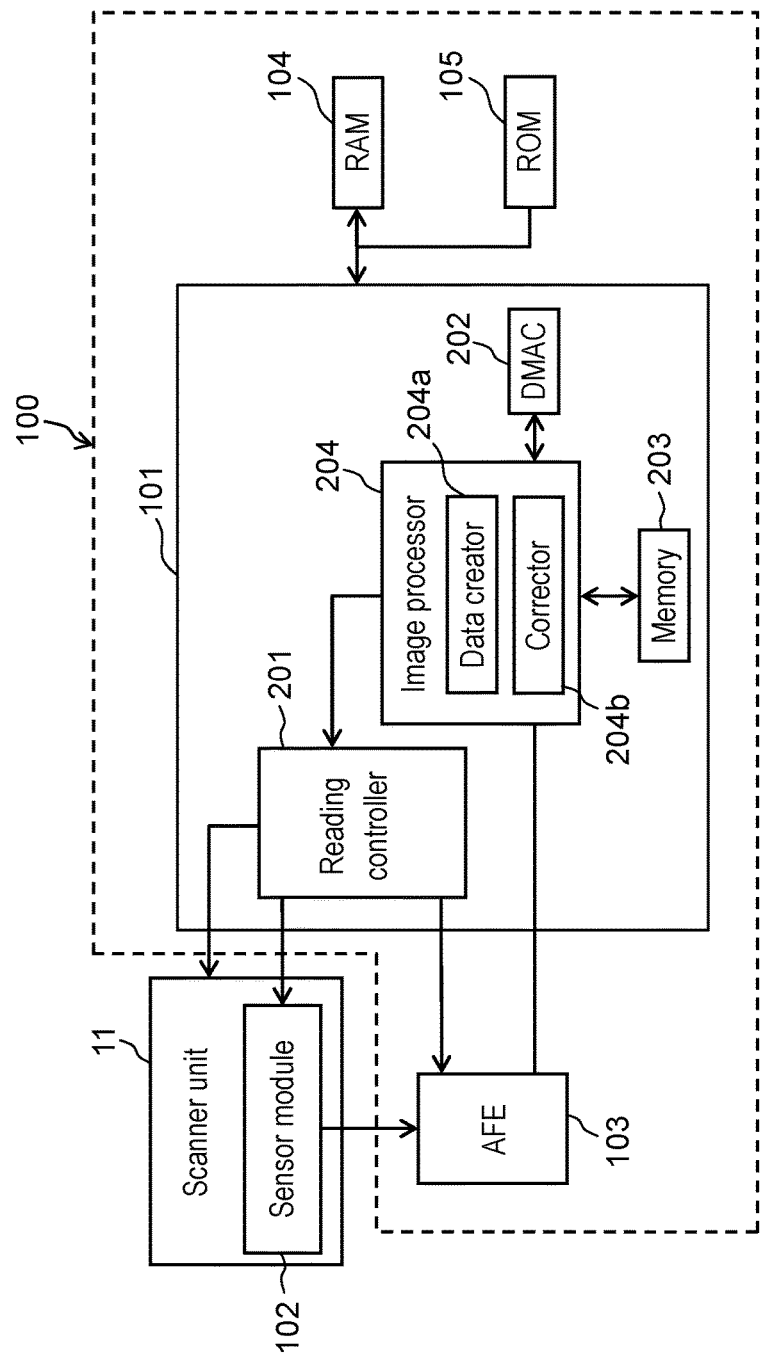
FIG. 5 is a block diagram illustrating an image reading apparatus according to Embodiment 1.

FIG. 5 is a block diagram of image reading apparatus 10 according to Embodiment 1.

As illustrated in FIG. 5, image reading apparatus 10 includes scanner unit 11 and controller 100.

Controller 100 controls image reading operation of scanner unit 11, and also performs image processing on image signals output from scanner unit 11. Controller 100 includes central processing unit (CPU) 101, analog front end circuit (AFE) 103, random access memory (RAM) 104, and read only memory (ROM) 105.

Image signals (analog signals) from sensor module 102 in scanner unit 11 are input to AFE 103. AFE 103 includes an analog-to-digital converter and an amplifier, for instance. AFE 103 amplifies the image signals from sensor module 102 with the amplifier, adds/subtracts offset to/from the amplified image signals, converts the resultant image signals into digital signals (image data) with the analog-to-digital converter, and outputs the digital signals to CPU 101.

RAM 104 stores image data obtained by CPU 101. ROM 105 stores a predetermined program to be used for image processing by CPU 101.

CPU 101 includes reading controller 201, direct memory access controller (DMAC) 202, memory 203, and image processor 204.

Reading controller 201 controls operation of scanner unit 11 (including sensor module 102), ADF 16, and AFE 103. For example, reading controller 201 controls driving of a motor (not illustrated) for conveying original S set on ADF 16.

Image processor 204 performs image processing on image signals input from AFE 103. Image processor 204 reads a program stored in ROM 105, and executes image processing on the image signals by executing the read program. Image processor 204 executes various types of image processing such as filter processing and shading correction, details of which will be later described. Image processor 204 includes data creator 204a and corrector 204b.

DMAC 202 performs data transfer processing of transferring the resultant image signals on which image processor 204 has performed image processing.

Memory 203 stores various data. For example, memory 203 stores data for use in shading correction.

[2. Operation]

[2-1. Image Reading Operation]

Figure 6:
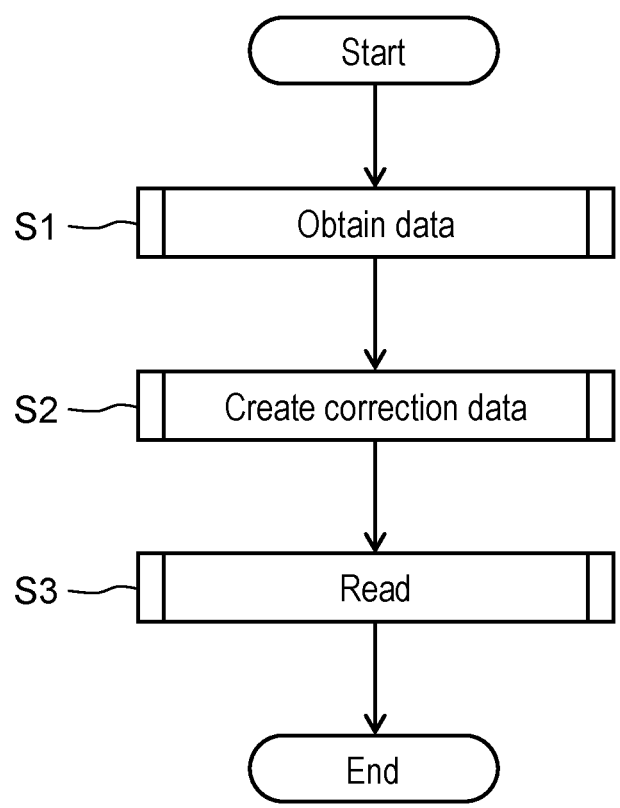
FIG. 6 is a flowchart illustrating image reading operation of the image reading apparatus according to Embodiment 1.

A description of operation of image reading apparatus 10 is given. FIG. 6 is a flowchart illustrating image reading operation performed by image reading apparatus 10 according to Embodiment 1.

Image reading operation starts when image reading apparatus 10 is turned on and a user operation is received. First, in step S1, image processor 204 obtains data for creating correction data to be used for shading correction. Next, in step S2, image processor 204 creates correction data based on the data obtained in step S1. After that, in step S3, image processor 204 reads an original. At this time, image processor 204 performs shading correction on image signals obtained by reading the original, using the correction data.

[2-2. Obtaining Data]

Figure 7:
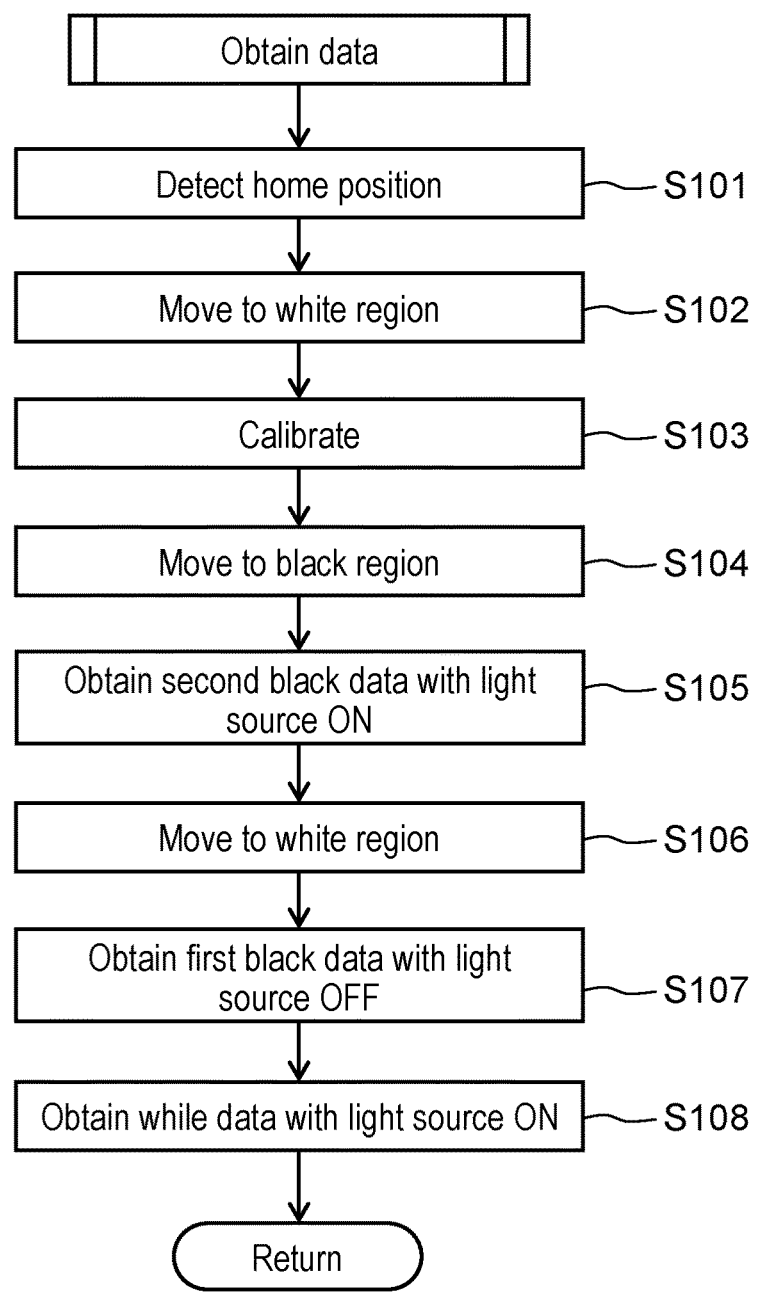
FIG. 7 is a flowchart illustrating data obtaining processing by the image reading apparatus according to Embodiment 1.

FIG. 7 is a flowchart illustrating processing of obtaining data by image reading apparatus 10 according to Embodiment 1.

In step S101, image processor 204 detects a home position. Specifically, image processor 204 moves sensor module 102 to a home position stored in memory 203 via reading controller 201. This position is a provisional home position. Then, image processor 204 causes sensor module 102 to obtain an image at the position, and determines whether reference pattern P is detected from the obtained image. If image processor 204 detects reference pattern P, image processor 204 determines that sensor module 102 is currently at an appropriate home position. If image processor 204 does not detect reference pattern P, image processor 204 moves sensor module 102 in one sub-scanning direction, and causes sensor module 102 to search for reference pattern P. When image processor 204 detects reference pattern P, image processor 204 completes detection of the home position. If image processor 204 does not detect the reference pattern even if sensor module 102 is moved from the provisional home position by a certain amount in the one sub-scanning direction, image processor 204 causes sensor module 102 to return to the provisional home position and to search for reference pattern P, moving sensor module 102 from the provisional home position in the other sub-scanning direction.

Image processor 204 causes sensor module 102 to keep moving in the other sub-scanning direction until image processor 204 detects reference pattern P. Image processor 204 stores the position of the detected home position into memory 203, and uses the home position stored in memory 203 as a provisional home position when image processor 204 is to detect a home position next time.

Next, in step S102, image processor 204 moves sensor module 102 via reading controller 201 up to a position where sensor module 102 faces white region R11 of reference member 14. The distance between reference pattern P and white region R11 in a sub-scanning direction is known, and thus image processor 204 accurately moves sensor module 102 up to the position where sensor module 102 faces white region R11, based on the home position detected in step S101.

When sensor module 102 has moved to the position where sensor module 102 faces white region R11, image processor 204 executes calibration in step S103. For example, image processor 204 makes an initial setting including setting of a time period during which light source 205 emits light and setting of AFE 103. The output levels of image signals that are output from sensors 207 can be made substantially the same, by setting a time period during which light source 205 emits light.

When calibration is completed, image processor 204 moves, in step S104, sensor module 102 via reading controller 201 from the position where sensor module 102 faces white region R11 to a position where sensor module 102 faces black region R12. The distance between the home position and black region R12 in a sub-scanning direction is known, and thus image processor 204 can accurately move sensor module 102 up to the position where sensor module 102 faces black region R12, based on the home position detected in step S101.

Next, in step S105, image processor 204 causes light source 205 to irradiate black region R12 of reference member 14 with light (turns on the light source), causes sensors 207 to read, multiple times, reflected light of the light with which black region R12 is irradiated, obtains second black data later described, based on the results of reading the reflected light, and stores the second black data into memory 203.

Upon completion of obtaining the second black data, in step S106, image processor 204 again moves, via reading controller 201, sensor module 102 to the position where sensor module 102 faces white region R11 of reference member 14.

Next, in step S107, image processor 204 obtains an image while light source 205 is emitting no light (the light source is off). In this case, since light source 205 is emitting no light, at least light from light source 205 (that is, light emitted from light source 205 and reflected off a subject) does not enter sensors 207. Specifically, image data obtained at this time indicates the output level of sensors 207 for black which is at the level of darkest shade. Image processor 204 stores this image data as first black data into memory 203.

Furthermore, in step S108, image processor 204 obtains white data while the light source is on. Specifically, image processor 204 obtains an image of white region R11 of reference member 14 while light source 205 is emitting light. The reflectance of white region R11 is substantially 100%. Accordingly, the obtained image data, that is, white data indicates the output level of sensor 207 for white which is at the level of lightest shade. Image processor 204 stores this white data as white correction data into memory 203. Note that processing in step S107 and processing in step S108 may be performed in the reverse order.

[2-3. Obtaining Second Black Data]

Image processor 204 causes sensor module 102 to read light reflected off black region R12 of reference member 14 multiple times each at a different position. Image processor 204 generates second black data using image signals obtained through a plurality of readings. Also in a case where FFC 15 is still vibrating after moving sensor module 102 from white region R11 to black region R12, influence of variation in crosstalk described below can be reduced by reflecting the results of the plurality of readings in generating the second black data. The higher speed sensor module 102 moves at, the more noticeably FFC 15 vibrates. Accordingly, the technology according to the present disclosure yields more advantageous effects as the speed at which image reading apparatus 10 moves increases. Here, it is also conceivable to stop sensors 207 from reading reflected light until FFC 15 completely stops vibrating. However, providing such a standby time leads to a delay in processing and consequently increases waiting time for a user, which is thus not a practical option. In addition, it is not easy to determine whether the vibration has completely stopped. Also, it is necessary to provide a new component such as a sensor or a new function for determining whether the vibration has stopped.

Figure 8:
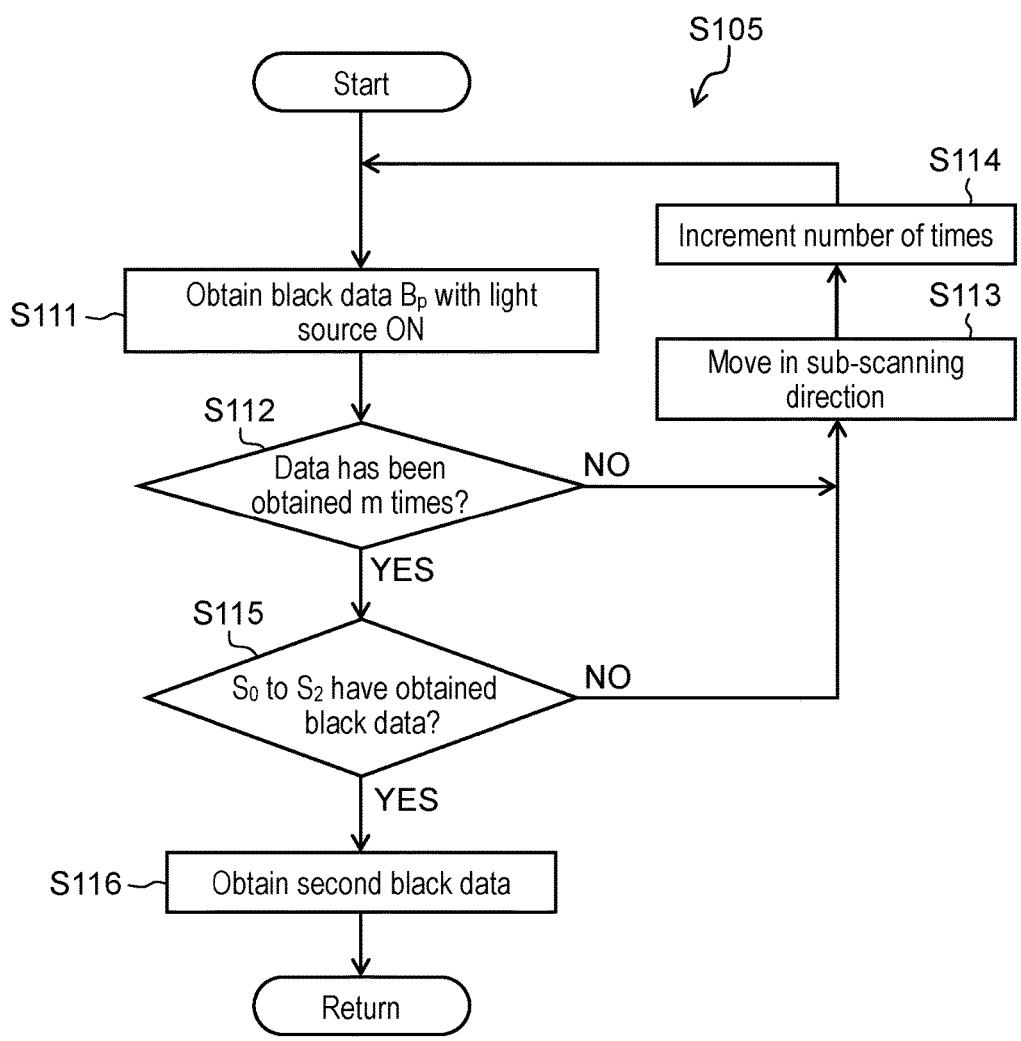
FIG. 8 is a flowchart of obtaining second black data by the image reading apparatus according to Embodiment 1.
Figure 9:
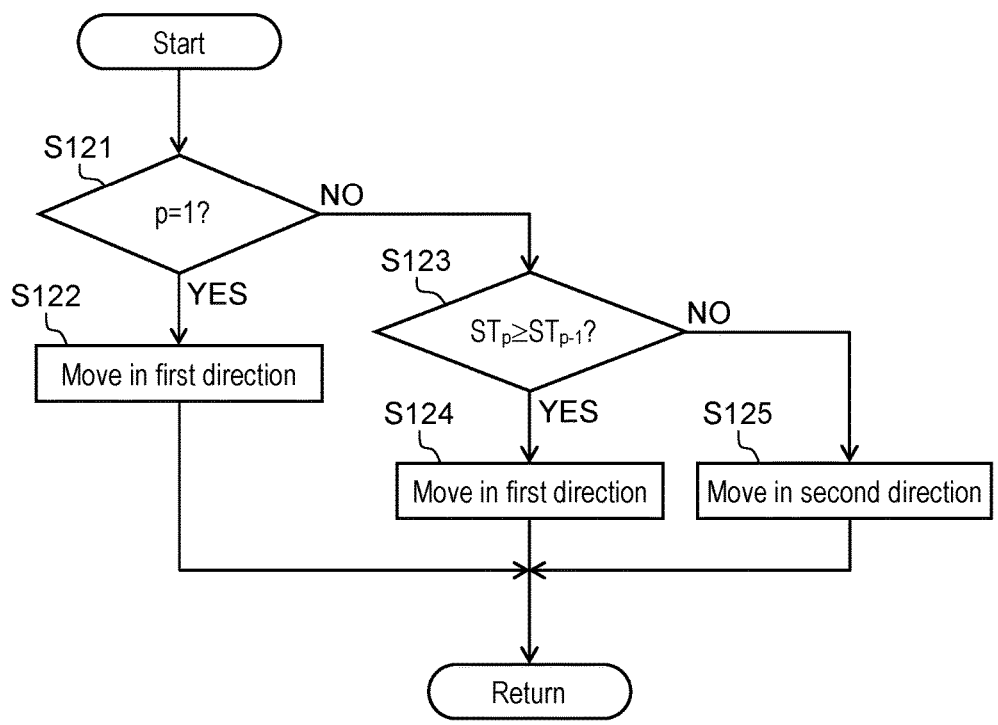
FIG. 9 is a flowchart for determining a direction to move the sensor module of the image reading apparatus according to Embodiment 1.
Figure 10A:
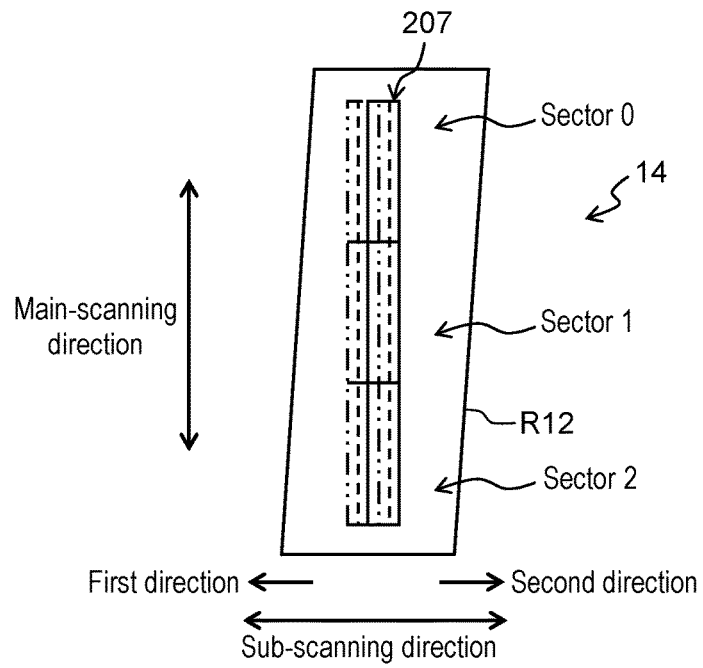
FIG. 10A illustrates an example of a positional relationship between a black region of the reference member and sensors.
Figure 10B:
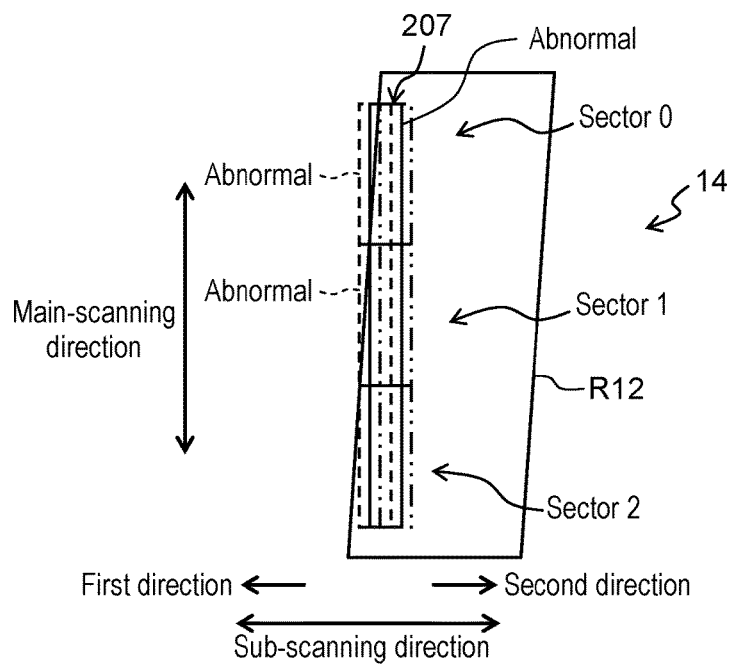
FIG. 10B illustrates another example of a positional relationship between the black region of the reference member and the sensors.

The following more specifically describes obtaining the second black data with reference to FIGS. 8 to 10B. FIG. 8 is a flowchart for obtaining second black data by image reading apparatus 10 according to Embodiment 1. FIG. 9 is a flowchart for determining a direction to move the sensor module of image reading apparatus 10, according to Embodiment 1. FIG. 10A illustrates an example of the positional relationship between the black region of the reference member and the sensors. FIG. 10B illustrates another example of the positional relationship between the black region of the reference member and the sensors.

In the following description, sensors 207 are divided into three sectors, and the sectors are each expressed by $S_i$ (i=0 to 2). Sector $S_0$ includes sensors 207 located at an end of sensor module 102 in a main-scanning direction. Sector $S_1$ is adjacent to sector $S_0$. Sector $S_2$ is adjacent to sector $S_1$ and includes sensors 207 located at the other end of sensor module 102 in the main-scanning direction. In addition, when second black data is to be obtained, third black data for generating second black data is obtained m times (m>1), and the obtained third black data is expressed by $B_{p0}$ to $B_{pi}$ (p=1 to m, i=0 to 2). Here, p denotes what iteration of obtaining third black data, and i denotes the sector number of a sector which has obtained the third black data.

In step S104 in FIG. 7, sensor module 102 moves from the position where sensor module 102 faces white region R11 to the position where sensor module 102 faces black region R12, and thereafter in step S111 in FIG. 8, image processor 204 obtains third black data $B_{10}$ to $B_{12}$ through the first reading. Specifically, image processor 204 obtains an image of black region R12 through the first reading while light source 205 is emitting light (on). Specifically, image processor 204 causes sensor module 102 to receive light reflected off black region R12, and converts the reflected light into image signals. At this time, although the subject is black, sensor module 102 receives light emitted from light source 205 and then reflected off black region R12. Accordingly, the obtained image data does not indicate the output level of sensors 207 for black which is at a level of darkest shade, but rather indicates the output level of sensors 207 for a color close to black, which is at a level of relatively dark shade.

Next, in step S112, image processor 204 determines whether the number of times third black data $B_{pi}$ is obtained has reached m. If the number of times third black data $B_{pi}$ is obtained is less than m (p<m), image processor 204 shifts, in step S113, the position of sensor module 102 by a predetermined step size in a predetermined moving direction among the sub-scanning directions. After that, in S114, image processor 204 increments the number of times third black data $B_{pi}$ is obtained, and in step S111, obtains third black data $B_{20}$ to $B_{22}$ based on image signals of black region R12 obtained through the second reading. After that, following the same flow, image processor 204 repeats processing of steps S111 to S114 until the number of times third black data $B_{pi}$ is obtained reaches m.

Note that the direction to move sensor module 102 in step S113 described above may be determined according to whether sectors $S_0$ to $S_2$ have obtained normal third black data $B_{pi}$, for example.

Normally, reference member 14 is attached so as to extend in a main-scanning direction, yet due to, for instance, reference member 14 being misaligned when attached, reference member 14 may have a certain tilt to a main-scanning direction as illustrated in FIGS. 10A and 10B.

In the following description, the number of sectors $S_0$ to $S_2$ which have obtained normal third black data $B_{p0}$ to $B_{p2}$ (p=1 to m) is indicated by $ST_p$ (p=1 to m). In FIGS. 10A and 10B, a description is given assuming that the number m of times third black data $B_{p0}$ to $B_{p2}$ are obtained are three, a direction to the left in the drawing is a first direction, and a direction to the right in the drawing is a second direction.

Note that the first direction can be an arbitrarily determined direction among the sub-scanning directions.

First, in step S111 in FIG. 8, image processor 204 obtains third black data $B_{10}$ to $B_{12}$ through the first reading, in a state where sensor module 102 is in a position indicated by the solid line in FIG. 10A. Image processor 204 shifts the position of sensor module 102 by a predetermined step size in the first direction (to a position indicated by the dashed line in FIG. 10A) in step S122 following step S121 in FIG. 9. After that, in step S111, image processor 204 obtains third black data $B_{20}$ to $B_{22}$ through the second reading. In the example in FIG. 10A, third black data $B_{10}$ to $B_{12}$ obtained through the first reading and third black data $B_{20}$ to $B_{22}$ obtained through the second reading are all normal data, and thus both $ST_1$ and $ST_2$ indicate "3." Note that the predetermined step size can be arbitrarily determined.

Next, image processor 204 obtains third black data $B_{20}$ to $B_{22}$ through the second reading in the position indicated by the dashed line in FIG. 10A (NO in step S121), and thereafter compares $ST_1$ with $ST_2$ in step S123. Then, if the number $ST_p$ of sectors which have obtained normal data is equal to or greater than the previous number $ST_{p-1}$ of sectors which have obtained normal data, image processor 204 moves sensor module 102 in the same direction (the first direction in FIG. 10A) also for the third reading, and obtains third black data $B_{30}$ to $B_{32}$ through the third reading in the position indicated by the two-dot chain line in FIG. 10A. In the example in FIG. 10A, sectors $S_0$ to $S_2$ have obtained normal third black data through the first to third readings.

On the other hand, as illustrated in FIG. 10B, the number $ST_2$ for third black data obtained through the second reading (see the position indicated by the dotted line in FIG. 10B) is less than the number $ST_1$ for third black data obtained through the first reading (see the position indicated by the solid line in FIG. 10B), image processor 204 moves sensor module 102 in the second direction, by a predetermined step size from the position where the third black data has been obtained through the first reading. Then, image processor 204 obtains third black data through the third reading in the position indicated by the two-dot chain line in FIG. 10B. In the example in FIG. 10B, among third black data $B_{10}$ to $B_{12}$ obtained through the first reading, black data $B_{10}$ obtained by sector $S_0$ is abnormal data ($ST_1$=2), and among third black data $B_{20}$ to $B_{22}$ obtained through the second reading, third black data $B_{20}$ and $B_{21}$ are abnormal data ($ST_2$=1). Third black data $B_{30}$ to $B_{32}$ obtained after sensor module 102 has been moved in the second direction are all normal data ($ST_3$=3). In this case, image processor 204 may store, into memory 203, the position which is indicated by the two-dot chain line and at which all the sectors have obtained normal third black data, and may obtain the third black data firstly at the position stored in memory 203 when the third black data is to be obtained through the subsequent readings.

Referring back to FIG. 8, if the number of times third black data $B_{p0}$ to $B_{pi}$ are obtained has reached m (YES in step S112) and all sectors $S_0$ to $S_2$ have obtained normal third black data (YES in step S115), image processor 204 obtains second black data in step S116. Specifically, image processor 204 generates second black data, based on normal third black data $B_{pi}$ among third black data $B_{pi}$ obtained through the mth reading. Note that a specific generation method can be arbitrarily determined. For example, for each of sectors $S_0$ to $S_2$, normal third black data (for example, $B_{p0}$, $B_{p1}$, or $B_{p2}$) obtained by the sector may be averaged to obtain second black data for the sector. In addition, second black data may be created according to a given calculation formula for assigning a weight based on, for instance, how recently data is obtained or a deviation of data.

For example, in the example in FIG. 10A, third black data $B_{10}$ to $B_{12}$, $B_{20}$ to $B_{22}$, and $B_{30}$ to $B_{32}$ are all normal data obtained by sectors $S_0$ to $S_2$ through the first to third readings, and thus image processor 204 averages third black data $B_{10}$, $B_{20}$, and $B_{30}$ to obtain second black data for sector $S_0$. Similarly, image processor 204 averages third black data $B_{11}$, $B_{21}$, and $B_{31}$ to obtain second black data for sector $S_1$, and averages third black data $B_{12}$, $B_{22}$, and $B_{32}$ to obtain second black data for sector $S_2$.

In the example in FIG. 10B, normal third black data $B_{30}$ may be used as second black data for sector $S_0$, an average of third black data $B_{11}$ and $B_{31}$ may be used as second black data for sector $S_1$, and an average of third black data $B_{12}$, $B_{22}$, and $B_{32}$ may be used as second black data for sector $S_2$.

On the other hand, in step S115, if not all sectors $S_0$ to $S_2$ have obtained normal third black data, the flow of steps S111 to S114 in FIG. 8 and the flow of steps S121 to S125 in FIG. 9 are repeated to again obtain third black data, until all sectors $S_0$ to $S_2$ obtain normal third black data. After all sectors $S_0$ to $S_2$ have obtained normal third black data, second black data is obtained (created) in step S116.

Note that whether normal third black data has been obtained can be readily determined based on a determination as to whether, for example, the output level of an image signal obtained based on reflected light has exceeded a predetermined threshold, since, for example, there is a considerable difference between the output level of an image signal obtained by a light source irradiating black region R12 with light and the output level of an image signal obtained by the light source irradiating a region other than black region R12 such as white region R11 with light.

Black data is obtained multiple times with the same step size, yet the step size may be changed according to whether normal third black data has been obtained.

[2-4. Creating Correction Data]

Here, black correction data to be used as a black reference for shading correction is created from first black data and second black data obtained by data obtaining processing. Creating black correction data using first black data and second black data reduces influence from uneven density due to crosstalk described below.

Image signals from sensors 207 may interfere one another (crosstalk) in a transmission line for the sensors, and consequently noise may occur in the image signals. In particular, crosstalk easily occurs due to the bending of FFC 15 with a configuration in which image signals are output via FFC 15, as sensors 207 do so.

Figure 11:
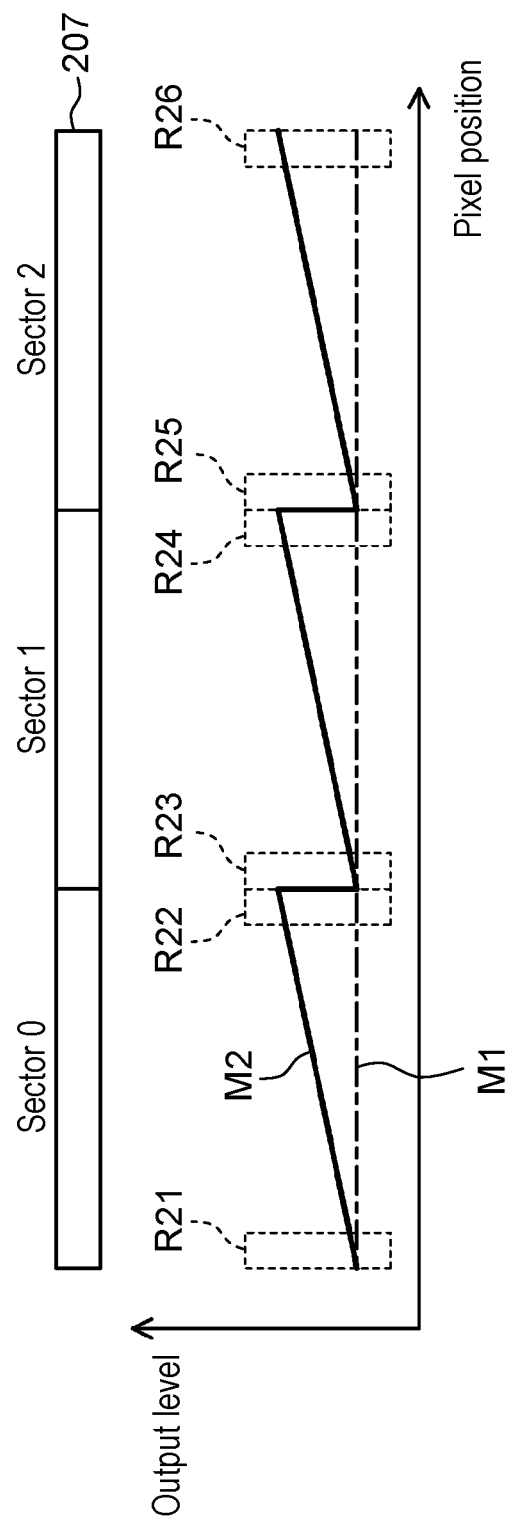
FIG. 11 illustrates examples of output levels of the sensors.

FIG. 11 illustrates examples of the output levels of sensors.

In FIG. 11, dashed dotted line M1 shows the output level when no crosstalk occurs, and solid line M2 shows the output level when crosstalk occurs. The vertical axis in FIG. 11 represents the output level of sensors 207, and the horizontal axis represents positions of pixels of sensors 207 in a main-scanning direction. For example, assuming that there are no individual differences between pixels, the output level for each pixel when an image of a subject having uniform reflectance is captured is substantially constant when no crosstalk occurs, as shown by dashed dotted line M1 in FIG. 11. However, when crosstalk occurs, the output level for each pixel of each sector varies, as shown by solid line M2 in FIG. 11. For example, as illustrated in FIG. 11, the output level for each pixel of each sector linearly increases from one end side of a sector to the other end side of the sector. Furthermore, if there is a difference in the output level for each pixel of each sector, a steplike change in the output level is caused at a portion where sectors switch.

Figure 12C:
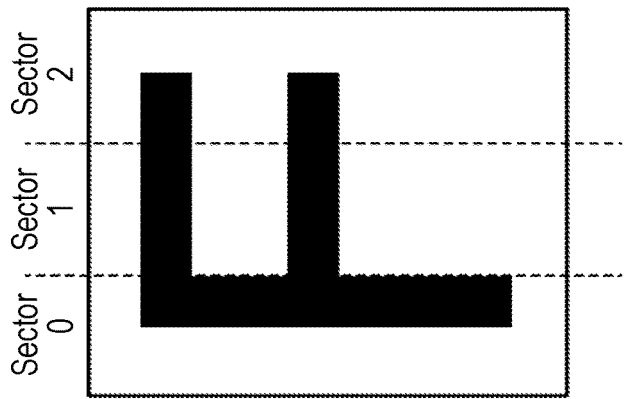
FIG. 12C illustrates a read image on which shading correction has been performed.
Figure 12B:
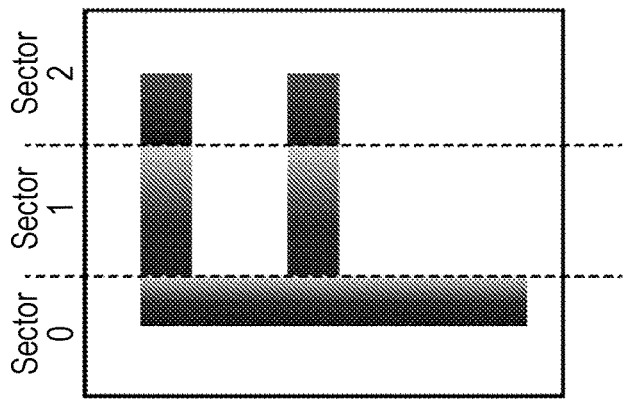
FIG. 12B illustrates a read image on which conventional shading correction has been performed.
Figure 12A:
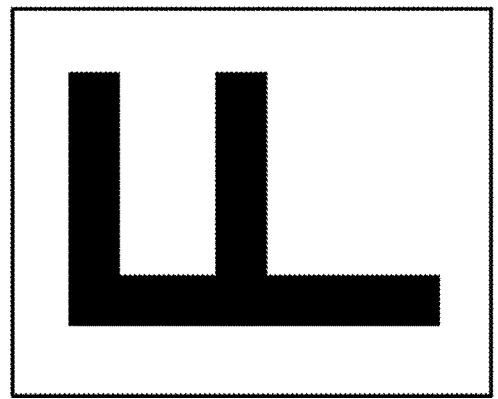
FIG. 12A illustrates an image on an original.

FIG. 12A illustrates an image on an original. FIG. 12B illustrates a read image on which conventional shading correction has been performed. FIG. 12C illustrates a read image on which shading correction has been performed.

FIG. 12A illustrates an example of an image on original S. FIG. 12B illustrates a read image which is obtained by reading the image illustrated in FIG. 12A and on which conventional shading correction has been performed.

If noise due to crosstalk occurs, uneven density appears in a read image as illustrated in FIG. 12B. In the read image illustrated in FIG. 12B, uneven density has appeared at portions corresponding to the boundaries of the sectors of sensors 207.

Figure 13:
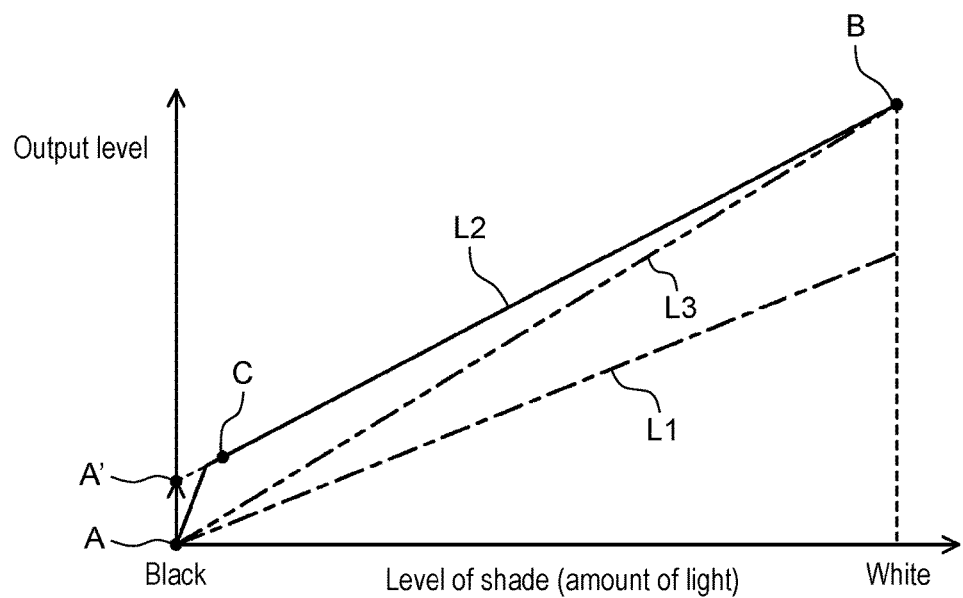
FIG. 13 is a graph showing a relationship between a level of shade and an output level of the sensors.

FIG. 13 is a graph showing a relationship between a level of shade and an output level of the sensors.

Each pixel of sensors 207 outputs a signal having a voltage according to the amount of light. A change in the voltage according to the amount of light depends on a characteristic of sensor 207. For example, if a voltage linearly changes according to the amount of light, an ideal change in voltage is as shown by dashed dotted line L1. However, if noise due to crosstalk (hereinafter referred to as "interference noise") is superposed on an output signal, a change in voltage is as shown by solid line L2. Specifically, in the case of black which is at the level of darkest shade, the output level is low, and thus almost no interference noise appears. However, when the level of shade for black is changed to the level of shade for a lighter color, the output level of sensors 207 increases, and interference noise increases, accordingly.

According to conventional typical shading correction, image data is obtained in a state (point A) where light source 205 is emitting no light, and the obtained image data is used as black correction data serving as a black reference. White image data is obtained in a state (point B) where light source 205 is emitting light, and the obtained image data is used as white correction data serving as a white reference. By performing shading correction using black correction data and white correction data which are thus obtained, the offset for each pixel and the gain for each pixel (dynamic range) are corrected. However, influence due to interference noise is less likely to appear in an image signal obtained while light source 205 is emitting no light. Accordingly, if shading correction is performed using image data at point A and image data at point B, shading correction is performed based on the characteristic as shown by two-dot chain line L3, which is different from the actual output characteristic of sensors 207, and thus shading correction cannot be performed appropriately.

In view of this, image reading apparatus 10 according to the present disclosure creates black correction data, using the first black data obtained while light source 205 is emitting no light and the second black data obtained while light source 205 is emitting light.

Figure 14:
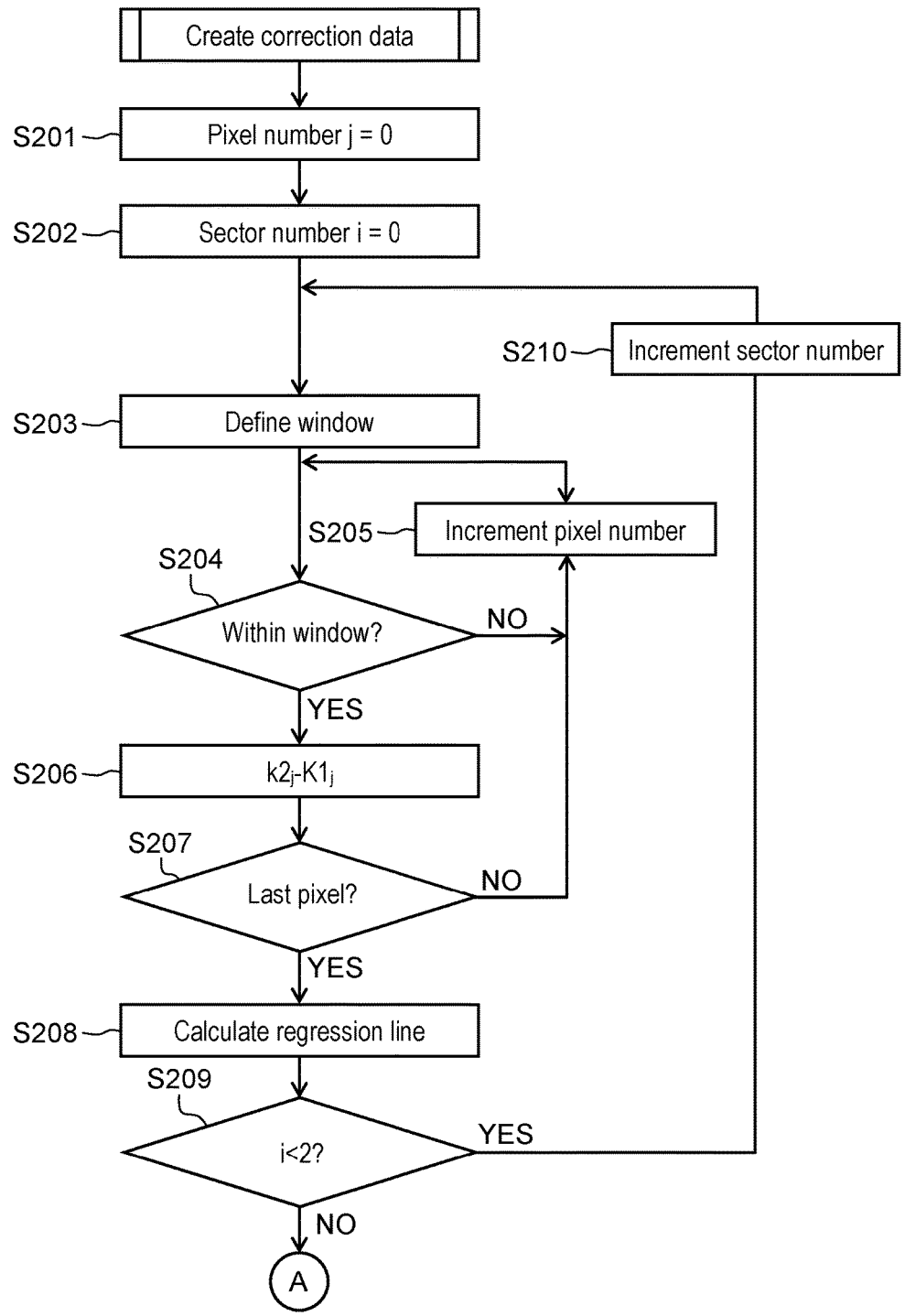
FIG. 14 is a flowchart illustrating a first part of processing of creating correction data performed by the image reading apparatus according to Embodiment 1.
Figure 15:
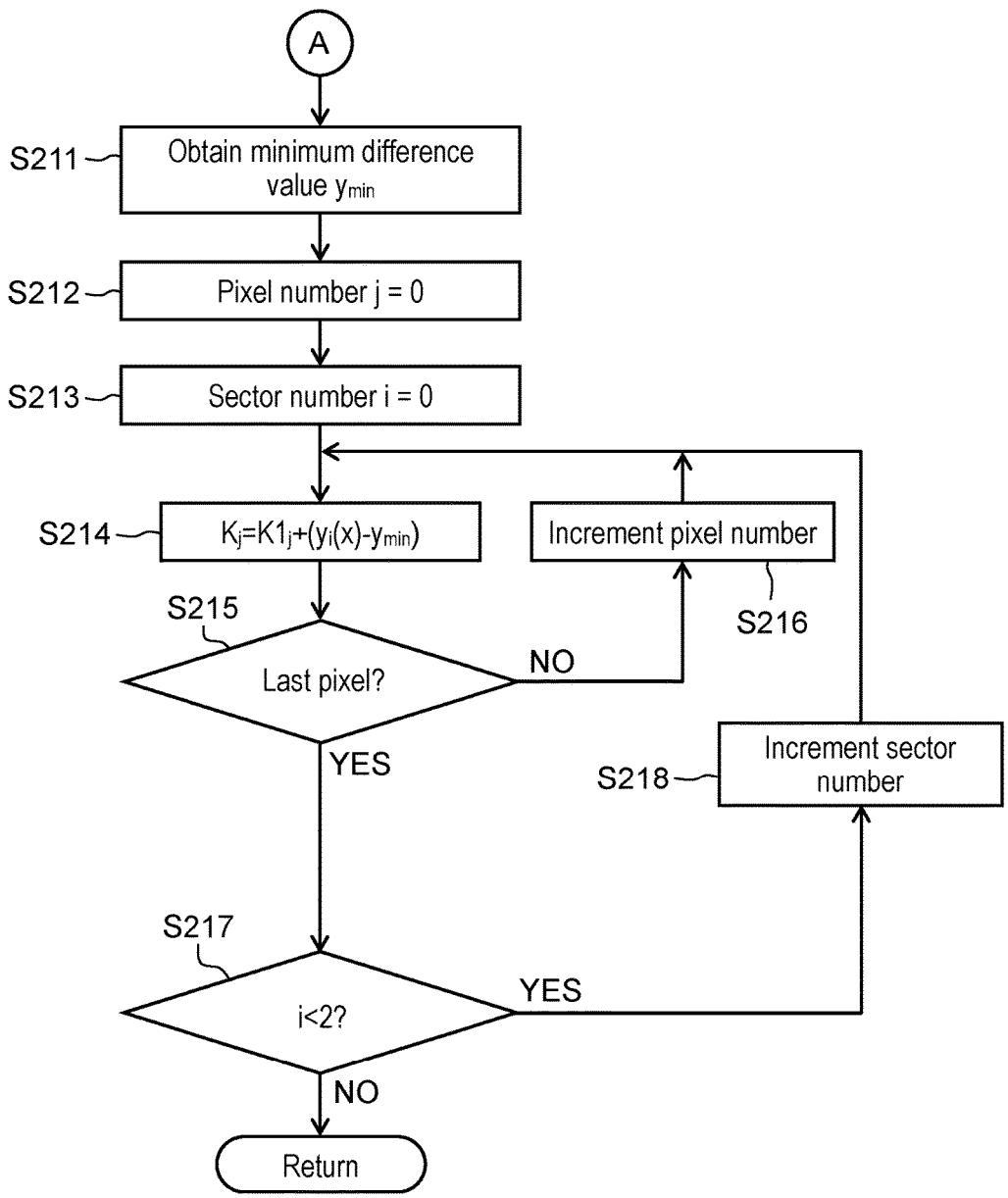
FIG. 15 is a flowchart of a latter part of the processing of creating correction data performed by the image reading apparatus according to Embodiment 1.
Figure 16:
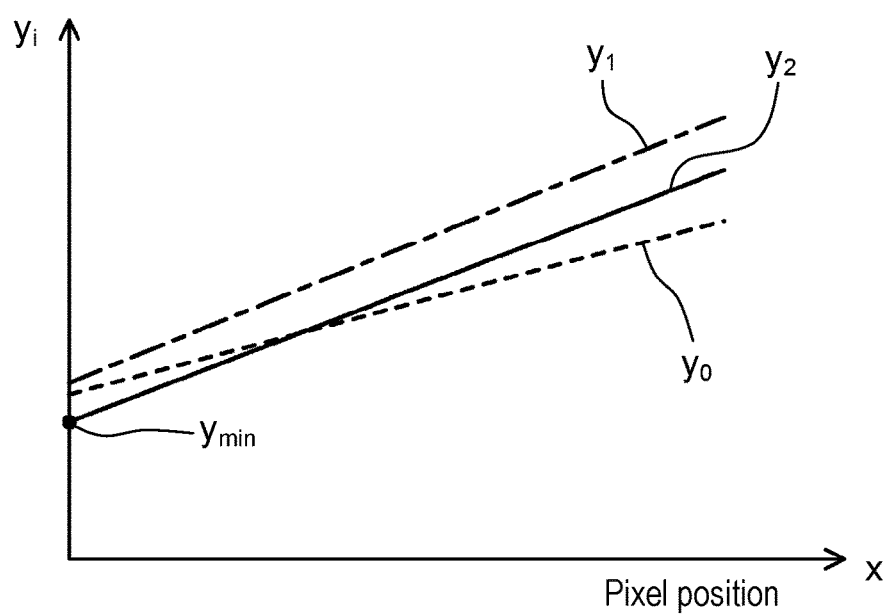
FIG. 16 illustrates regression lines for difference values for sectors.

FIG. 14 is a flowchart illustrating a first part of processing of creating correction data by image reading apparatus 10 according to Embodiment 1. FIG. 15 is a flowchart illustrating a latter part of the processing of creating correction data by image reading apparatus 10 according to Embodiment 1. FIG. 16 illustrates regression lines for difference values for the sectors.

In the following description, the number of pixels is expressed by n, a sector is expressed by $S_i$ (i=0 to 2), and a pixel is expressed by $X_j$ (j=0 to n−1). Pixel $X_0$ is at an end in a main-scanning direction and included in each sensor 207. The greater the pixel number j is, the closer to the other end in the main-scanning direction a pixel is disposed. Pixel $X_{n-1}$ is a pixel in each sensor 207 at the other end in the main-scanning direction.

In step S201, image processor 204 sets the pixel number j to 0. In step S202, image processor 204 sets the sector number i to 0.

Next, in step S203, image processor 204 defines, in each sector, regions (windows) in which later-described difference values are calculated. Specifically, as illustrated in FIG. 11, image processor 204 defines, in each sector, windows at the end portion and the other end portion in a main-scanning direction. Image processor 204 determines the width of each window such that a predetermined number of pixels are included. In FIG. 11, in sector $S_0$, image processor 204 defines start window R21 at an end portion in a main-scanning direction, and end window R22 at the other end portion. In sector $S_1$, image processor 204 defines start window R23 at an end portion in a main-scanning direction, and end window R24 at the other end portion. In sector $S_2$, image processor 204 defines start window R25 at an end portion in a main-scanning direction, and end window R26 at the other end portion.

In step S204, image processor 204 determines whether pixel $X_j$ is included in a window. For example, immediately after performing step S201, pixel $X_j$ is included in start window R21 of sector $S_0$ since j=0.

If pixel $X_j$ is outside any window, image processor 204 increments pixel number j in step S205, and executes processing of step S204 again. Specifically, image processor 204 determines whether subsequent pixel $X_j$ is included in a window.

On the other hand, if pixel $X_j$ is in a window, in step S206, image processor 204 obtains a difference value ($K2_j-K1_j$) between output level $K2_j$ of pixel $X_j$ for second black data and output level $K1_j$ of pixel $X_j$ for first black data, and stores the obtained difference value into memory 203.

After that, in step S207, image processor 204 determines whether pixel $X_j$ is the last pixel in sector $S_i$. If pixel $X_j$ is not the last pixel, image processor 204 increments the pixel number j in step S205, and executes processing of step S204 again.

On the other hand, if pixel $X_j$ is the last pixel, image processor 204 obtains a regression line for difference values for sector $S_i$ in step S208. Specifically, image processor 204 obtains, as illustrated in FIG. 16, a regression line $y_i(x)=a_i \times x+b_i$, for difference values of pixels included in the start window of sector $S_i$ and difference values of pixels included in the end window, where x denotes a pixel position in a sector, $y_i$ denotes a difference value, i denotes a sector number, $a_i$ denotes a regression line coefficient (tilt), and $b_i$ denotes a regression line coefficient (constant term). Image processor 204 stores obtained regression line coefficients $a_i$ and $b_i$ into memory 203. In FIG. 16, dotted line $y_0$ is a regression line for sector $S_0$. Dashed dotted line $y_1$ is a regression line for sector $S_1$. Solid line $y_2$ is a regression line for sector $S_2$.

Next, in step S209, image processor 204 determines whether the sector number i is smaller than "2." If the sector number i is smaller than "2," image processor 204 increments the sector number i in step S210, and executes processing of step S203 again. Specifically, unless sector $S_i$ for which a regression line is calculated is the last sector (that is, sector $S_2$), image processor 204 changes sector $S_i$ to subsequent sector $S_{i+1}$, and repeats calculation of a regression line for the subsequent sector.

On the other hand, if the sector number i is greater than or equal to "2," that is, if the sector number is 2, image processor 204 ends the first part of the processing of creating correction data.

Next, image processor 204 executes a latter part of the processing of creating correction data. Specifically, in step S211, as illustrated in FIG. 16, image processor 204 obtains minimum difference value $y_{min}$ which is the minimum value ($y_{min}$=min($y_i$)), among three regression lines $y_0$ to $y_2$ for sectors $S_0$, $S_1$, and $S_2$ stored in memory 203. Specifically, among the minimum values of the regression lines for the sectors, the smallest minimum value among the minimum values for the three sectors is minimum difference value $y_{min}$.

Next, image processor 204 sets pixel number j to 0 in step S212. Next, image processor 204 sets sector number i to 0 in step S213.

In step S214, using minimum difference value $y_{min}$, image processor 204 corrects output level $K1_j$ of pixel $X_j$ for first black data, and obtains black correction data. Specifically, correction value $K_j$ of pixel $X_j$ for black correction data is expressed by the following expression.

$$K_j = K1_j + (y_i(x) - y_{min})$$

Next, image processor 204 determines in step S215 whether pixel $X_j$ is the last pixel in sector $S_i$. If pixel $X_j$ is not the last pixel, image processor 204 increments pixel number j in step S216, and executes processing of step S214 again.

On the other hand, if pixel $X_j$ is the last pixel, image processor 204 determines whether the sector number i is smaller than "2" in step S217. If the sector number i is smaller than "2," image processor 204 increments the sector number i in step S218, and executes processing of step S214 again. In other words, unless sector $S_i$ for which black correction data has been calculated is the last sector (that is, sector $S_2$), image processor 204 changes sector $S_i$ to subsequent sector $S_{i+1}$, and repeats calculation of black correction data for the subsequent sector.

On the other hand, if the sector number i is greater than or equal to "2," namely, if the sector number is 2, image processor 204 ends the latter part of processing of creating correction data.

In this manner, image processor 204 adds a value obtained by subtracting minimum difference value $y_{min}$ from difference values $y_i(x)$ for each sector, to output level $K1_j$ of first black data, and obtains correction value $K_j$ of black shading correction data.

[2-5. Reading Processing]

Upon obtaining black correction data and white correction data, image processor 204 performs reading processing. Image processor 204 moves sensor module 102 via reading controller 201, and causes sensor module 102 to execute operation of reading an image on original S. Image processor 204 performs shading correction on the read image using black correction data and white correction data. The influence of uneven density resulting from crosstalk can be reduced by performing shading correction using black correction data and white correction data.

Specifically, the output level of the first black data obtained in step S105 is very low, and thus interference noise included in the first black data is also very small (see point A in FIG. 13). On the other hand, since second black data has a level of shade lighter than that of the first black data, interference noise has appeared in the second black data (see point C in FIG. 13). By correcting the first black data using the second black data, black correction data which includes interference noise can be created.

Second black data is an image signal of black region 31 of reference sheet 3 obtained while light source 205 is emitting light, and thus only a minute portion of the output of the second black data depends on light reflected off black region 31, and interference noise occupies most of the output. The density of black region 31 irradiated with light is extremely close to that of black, and thus compared to the output of the first black data, the output of the second black data includes slightly higher, but almost the same output which is dependent on light reflected off black region 31. Accordingly, difference value ($K2_j - K1_j$) between the output level of the second black data and the output level of the first black data can be considered as interference noise. In the present disclosure, linear regression is performed on difference values ($K2_j - K1_j$), and an offset of difference values ($K2_j - K1_j$) for each sector is corrected. However, theoretically, black correction data which includes interference noise is created by adding difference values ($K2_j - K1_j$) to the first black data. In other words, data at point A' in FIG. 13 is created.

By performing shading correction using the thus created black correction data (point A' in FIG. 13) which includes interference noise and white correction data (point B in FIG. 13) which initially includes interference noise, shading correction in accordance with the actual output of sensors 207 which includes interference noise can be performed. As a result, density unevenness at portions corresponding to the boundaries of the sectors of sensors 207 is reduced in a read image as illustrated in FIG. 12C, and the obtained read image is close to the image on original S in FIG. 12A.

Note that when images on originals S are to be read consecutively, image processor 204 may obtain black data twice or more using black region R12 of reference member 14, before the start of reading a series of images on originals S. Furthermore, each time an image on original S is read, first black data may be obtained once and white data may be obtained once, and furthermore black data may be obtained once or more using black region R12 of reference member 14. When the first original among originals S is to be read, second black data may be created (obtained) based on black data obtained prior to the start of reading a series of images. During the image reading, second black data may be created, each time original S is read, based on third black data obtained using black region R12, or may be created (obtained) using third black data obtained when original S was read in the past in addition to third black data obtained each time an image is read among the series of images.

When images on originals S are read consecutively, black data may be obtained using black region R12 of reference member 14 at predetermined intervals, rather than each time an image is read. Specifically, before the start of reading a series of images on originals S, black data may be obtained using black region R12 of reference member 14 more than once at each of predetermined intervals, and second black data may be created (obtained), based on a plurality of third black data obtained, including third black data obtained when original S was read in the past.

[3. Conclusion]

Image reading apparatus 10 according to the present disclosure includes: sensor module 102 which includes light source 205 which irradiates an object with light, and sensors 207 which read reflected light of the light with which the object is irradiated to obtain image signals. Image reading apparatus 10 includes: image processor 204 which creates black correction data to be used as a black reference in shading correction and white correction data to be used as a white reference in the shading correction; and reference member 14 for creating the black correction data and the white correction data, the reference member extending in a main-scanning direction predetermined. Image processor 204 corrects uneven density of an image resulting from interference of the image signals from the sensors, by performing, on the image signals obtained by sensors 207, the shading correction using the black correction data and the white correction data. Sensors 207 are disposed in the main-scanning direction, and configured such that the image signals obtained by sensors 207 form a one-line image signal in the main-scanning direction. Image processor 204 is configured to obtain white data by causing sensors 207 to obtain image signals of reference member 14, and create the white correction data based on the white data. Image processor 204 is configured to obtain intermediate data which has a level of shade lighter than a level of shade of the black reference and darker than a level of shade of the white reference by causing sensors 207 to obtain image signals of reference member 14, and create the black correction data based on the intermediate data. At least one of when creating the white correction data and when creating the black correction data, image processor 204 causes sensors 207 to obtain image signals of reference member 14 a plurality of times.

According to this configuration, image processor 204 obtains white data and/or intermediate data, by causing sensors 207 to obtain image signals of reference member 14 while light source 205 is emitting light. Accordingly, such white data and intermediate data include a certain degree of interference noise. Image processor 204 creates white correction data based on the white data, and creates black correction data based on the intermediate data, thus creating black correction data and white correction data each including interference noise. Thus, image processor 204 can correct uneven density of an image resulting from interference noise, by performing shading correction using such black correction data and white correction data. Interference noise may temporally vary depending on when white data/intermediate data is obtained. When creating white correction data/black correction data, image processor 204 having this configuration causes sensors 207 to obtain image signals of reference member 14 multiple times. Even if there is a temporal change in interference noise, the influence of variation in interference noise can be reduced, and density unevenness of an image can be stably reduced.

Image processor 204 creates at least one of the white correction data based on a plurality of the white data and the black correction data based on a plurality of the intermediate data, the plurality of white data being obtained by causing sensors 207 to obtain image signals of reference member 14 the plurality of times, the plurality of intermediate data being obtained by causing sensors 207 to obtain image signals of reference member 14 the plurality of times.

According to this configuration, image processor 204 creates white correction data based on a plurality of white data obtained by causing sensors 207 to obtain image signals of reference member 14 multiple times, or creates black correction data based on a plurality of intermediate data obtained by causing sensors 207 to obtain image signals of reference member 14 multiple times. For example, if interference noise temporally varies depending on when white data/intermediate data is obtained, white correction data and black correction data thus created reflect such variations. Accordingly, since image processor 204 creates white correction data and/or black correction data based on such data, the influence of variation in interference noise can be reduced, and density unevenness of an image can be stably reduced.

Image processor 204 causes sensors 207 to obtain image signals of reference member 14 the plurality of times, before the image on the object is obtained.

According to this configuration, image processor 204 causes sensors 207 to obtain image signals of reference member 14 multiple times before an image on an object is obtained, and thus the influence of variation in interference noise can be reduced, and density unevenness of an image can be stably reduced, from the first time the image on the object is obtained.

Furthermore, image processor 204 causes sensors 207 to obtain image signals of reference member 14 the plurality of times each at a different position in a sub-scanning direction orthogonal to the main-scanning direction.

According to this configuration, if any or all of sensors 207 has/have obtained an inappropriate image signal(s) of reference member 14, image processor 204 creates white correction data/black correction data, based on white data/intermediate data obtained based on appropriate image signals among the image signals obtained at different positions. Specifically, in addition to the elimination of influence of variation in interference noise, a shift in position in the sub-scanning direction can be corrected, and density unevenness of an image can be reduced more stably.

When images on objects are obtained, image processor 204 causes sensors 207 to obtain image signals of reference member 14, and image processor 204 creates at least one of the white correction data based on a plurality of the white data and the black correction data based on a plurality of the intermediate data, the plurality of white data being obtained from the image signals of reference member 14 obtained when the images on the objects are obtained, the plurality of intermediate data being obtained from the image signals of reference member 14 obtained when the images on the objects are obtained.

According to this configuration, image processor 204 can continuously create white correction data and/or black correction data while images on a plurality of objects are obtained. Accordingly, white correction data and black correction data can be updated as appropriate, and density unevenness of an image can be reduced continuously and more stably.

When sensors 207 obtain image signals of reference member 14, image processor 204 determines, for each of sensors 207, whether sensor 207 has obtained an appropriate image signal of reference member 14. If all sensors 207 have obtained appropriate image signals, image processor 204 uses the appropriate image signals in creating the white correction data or the black correction data. If any of sensors 207 has obtained an inappropriate image signal, image processor 204 shifts sensors 207 in a sub-scanning direction orthogonal to the main-scanning direction, and causes sensors 207 to again obtain image signals of reference member 14. Until image processor 204 determines that all sensors 207 have obtained appropriate image signals of reference member 14, image processor 204 repeatedly shifts sensors 207 in the sub-scanning direction and causes sensors 207 to obtain image signals of reference member 14.

According to this configuration, until all sensors 207 obtain appropriate image signals of reference member 14, that is, until image processor 204 creates appropriate white correction data/black correction data, image processor 204 shifts sensors 207 in the sub-scanning direction, and causes sensors 207 to again obtain image signals of reference member 14. This reduces density unevenness of an image more reliably.

Furthermore, reference member 14 has black region R12. Image processor 204 is configured to obtain the intermediate data by causing sensors 207 to obtain image signals of black region R12 irradiated with the light by light source 205. When image processor 204 obtains the intermediate data, image processor 204 causes sensors 207 to obtain image signals of black region R12 the plurality of times.

According to this configuration, image processor 204 obtains intermediate data (second black data) by causing sensors 207 to obtain image signals of black region R12 while light source 205 is emitting light, and thus intermediate data includes a certain degree of interference noise. Image processor 204 creates black correction data based on such intermediate data, so that the black correction data includes interference noise. Image processor 204 corrects uneven density of an image resulting from interference noise, by performing shading correction using black correction data thus created. When obtaining intermediate data, image processor 204 causes sensors 207 to obtain image signals of black region R12 multiple times, and thus density unevenness of an image can be reduced stably.

Reference member 14 has white region R11. Light source 205 is configured to switch at least between light having a maximum luminous intensity and light having an intermediate luminous intensity lower than the maximum luminous intensity. Image processor 204 is configured to obtain the white data by causing sensors 207 to obtain image signals of white region R11 irradiated with the light having the maximum luminous intensity, and obtain the intermediate data by causing sensors 207 to obtain image signals of white region R11 irradiated with the light having the intermediate luminous intensity. At least one of when obtaining the white data and when obtaining the intermediate data, image processor 204 causes sensors 207 to obtain image signals of white region R11 the plurality of times.

According to this configuration, image processor 204 obtains intermediate data, by causing sensors 207 to obtain image signals in a state where the luminous intensity of light source 205 is lowered down to the intermediate luminous intensity. Intermediate data includes a certain degree of interference noise. Image processor 204 creates intermediate data which includes interference noise, by creating intermediate data based on such image signals. Image processor 204 corrects uneven density of an image resulting from interference of image signals by performing shading correction using intermediate data thus created. When obtaining white data/intermediate data, image processor 204 causes sensors 207 to obtain image signals of white region R11 multiple times, and thus density unevenness of an image can be reduced stably.

Furthermore, image processor 204 obtains black data by causing sensors 207 to obtain image signals while light source 205 is emitting no light, and creates the black correction data based on the black data and the intermediate data.

According to this configuration, black data has a level of shade darker than the level of shade of intermediate data. However, since black data has a level of dark shade, the output level of the black data is low and interference noise included is also low. In other words, black data has a level of dark shade, yet interference noise does not appear appropriately in the black data. On the other hand, intermediate data has a level of shade lighter than the level of shade of black data, yet includes a certain degree of interference noise. Thus, image processor 204 creates black correction data based on black data and intermediate data (for example, black data which has been corrected using intermediate data), to create black correction data which has a level of dark shade and includes interference noise.

OTHER EMBODIMENTS

The above has described Embodiment 1 as an example of the technology disclosed in the present application. However, the technology according to the present disclosure is not limited to Embodiment 1, and is also applicable to embodiments as a result of appropriate change, replacement, addition, and omission, for instance. Furthermore, elements described in the above embodiment can be combined to achieve a new embodiment. In addition, the elements illustrated in the accompanying drawings and stated in the detailed description include not only an element necessary to address problems, but also an element which is not necessary to address the problems, in order to exemplify the technology. Accordingly, by the mere fact that such an element not necessary to address the problems is illustrated in an accompanying drawing and described in the detailed description, the element should not be immediately determined to be required.

The following configurations may be adopted in Embodiment 1.

For example, the present embodiment has described the case where sensors 207 are divided into three sectors, yet the number of sectors into which sensors 207 are divided is not limited to three.

Scanner unit 11 is connected to controller 100 via FFC 15, but may be connected thereto by another element. A given communication cable may be used as a line which connects scanner unit 11 and controller 100. For example, scanner unit 11 and controller 100 may be connected by, for instance, flexible printed circuits (FPCs). Also in this case, the same or similar problem occurs, and equivalent advantageous effects are obtained by using the technology according to the present disclosure.

As long as an intended result can be achieved, the order of steps in the flowcharts described above can be changed arbitrarily, and in addition, some of the steps can be processed in parallel. For example, when in the order second black data is obtained, calibration is performed, first black data is obtained, and white data is obtained may be changed. In the present embodiment, obtaining data is completed (step S1), and thereafter correction data is created (step S2). Yet, correction data may be created (step S2) at the point in time when first black data and second black data are successfully obtained during obtaining data (for example, before obtaining white data).

Furthermore, each time an image on original S is to be read, first black data and white data are obtained before reading the image, but may be obtained at different times. Each time an image on original S is read, first black data and white data may be obtained after reading the image. Furthermore, first black data and white data may be obtained once, before the start of reading a series of images on originals S, rather than each time an image on original S is to be read.

Furthermore, in the present embodiment, image processor 204 includes data creator 204a and corrector 204b, the present embodiment is not limited to this. Data creator 204a and corrector 204b may be different elements. Data creator 204a and corrector 204b do not need to be achieved by image processor 204, and a processor different from image processor 204 may function as data creator 204a or corrector 204b.

Figure 17:
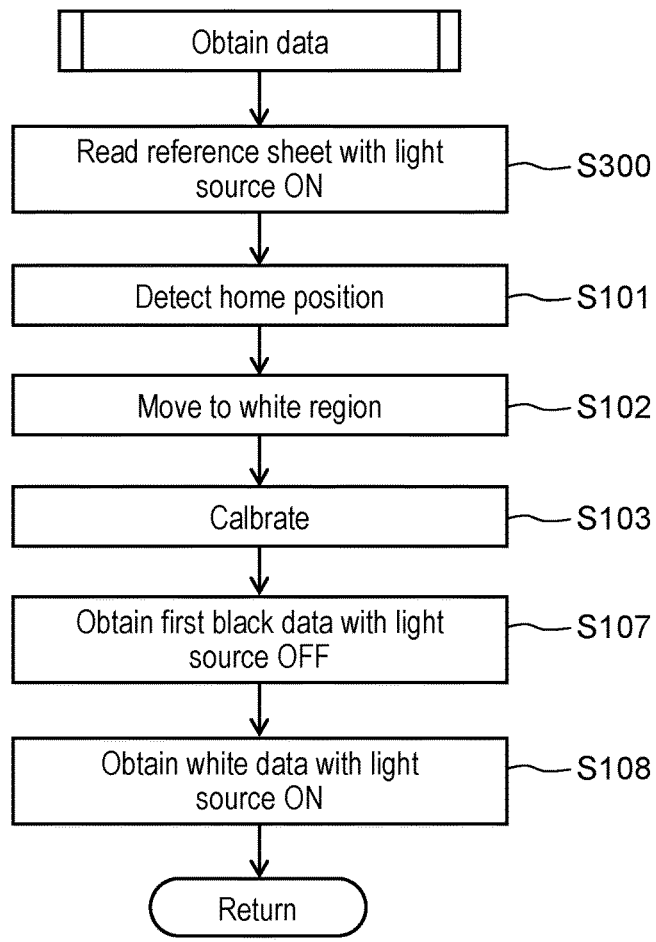
FIG. 17 is a flowchart illustrating another example of obtaining data.
Figure 18:
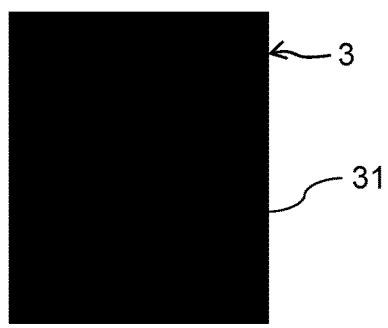
FIG. 18 is a schematic diagram of a reference sheet.

Furthermore, in the present embodiment, third black data is obtained from black region R12 of reference member 14, yet reference sheet 3 as illustrated in FIG. 18, which is an accessory of image reading apparatus 10 and the entire surface of which is black region 31 may be placed on FB glass 12, and third black data may be obtained from reference sheet 3. In this case, as illustrated in FIG. 17, prior to step S101 in FIG. 7, third black data is obtained from black region 31 of reference sheet 3 (step S300). Note that in step S300, as with step S105 in FIG. 7, while the position of sensor module 102 is shifted in a sub-scanning direction by a predetermined step size, third black data is obtained m times (m>1). In steps S101 to S103, S107, and S108 in FIG. 17, identical or similar processing to that of FIG. 7 is performed.

Furthermore, black correction data to be used as a black reference for shading correction is created using second black data obtained based on third black data in the present embodiment, yet the present embodiment is not limited to this. For example, a configuration may be adopted in which instead of third black data, light source 205 is configured to switch light to light having an intermediate luminous intensity lower than the maximum luminous intensity, and image processor 204 causes sensors 207 to obtain, multiple times, image signals of white region R11 of reference member 14 irradiated with light having the intermediate luminous intensity, obtain (create) intermediate data based on the image signals obtained the multiple times, and may create black correction data based on the intermediate data.

As described above, the technology disclosed here is useful for image reading apparatuses.

What is claimed is:

1. An image reading apparatus which reads an image on an object, the image reading apparatus comprising:
   a sensor module which includes a light source which irradiates the object with light, and sensors which read reflected light of the light with which the object is irradiated to obtain image signals;
   a data creator which creates black correction data to be used as a black reference in shading correction and white correction data to be used as a white reference in the shading correction;
   a reference member for creating the black correction data and the white correction data, the reference member extending in a main-scanning direction predetermined; and
   a corrector which corrects uneven density of an image resulting from interference of the image signals from the sensors, by performing, on the image signals obtained by the sensors, the shading correction using the black correction data and the white correction data, wherein
   the sensors are disposed in the main-scanning direction, and configured such that the image signals obtained by the sensors form a one-line image signal in the main-scanning direction,
   the data creator is configured to obtain white data by causing the sensors to obtain image signals of the reference member, and create the white correction data based on the white data,
   the data creator is configured to obtain intermediate data which has a level of shade lighter than a level of shade of the black reference and darker than a level of shade of the white reference by causing the sensors to obtain image signals of the reference member, and create the black correction data based on the intermediate data, and
   at least one of when creating the white correction data and when creating the black correction data, the data creator causes the sensors to obtain image signals of the reference member a plurality of times.

2. The image reading apparatus according to claim 1, wherein
   the data creator creates at least one of the white correction data based on a plurality of the white data and the black correction data based on a plurality of the intermediate data, the plurality of white data being obtained by causing the sensors to obtain image signals of the reference member the plurality of times, the plurality of intermediate data being obtained by causing the sensors to obtain image signals of the reference member the plurality of times.

3. The image reading apparatus according to claim 2, wherein
   the data creator causes the sensors to obtain image signals of the reference member the plurality of times, before the image on the object is obtained.

4. The image reading apparatus according to claim 3, wherein
   the data creator causes the sensors to obtain image signals of the reference member the plurality of times each at a different position in a sub-scanning direction orthogonal to the main-scanning direction.

5. The image reading apparatus according to claim 2, wherein
   when images on objects are obtained, the data creator causes the sensors to obtain image signals of the reference member, and
   the data creator creates at least one of the white correction data based on a plurality of the white data and the black correction data based on a plurality of the intermediate data, the plurality of white data being obtained from the image signals of the reference member obtained when the images on the objects are obtained, the plurality of intermediate data being obtained from the image signals of the reference member obtained when the images on the objects are obtained.

6. The image reading apparatus according to claim 1, wherein
   when the sensors obtain image signals of the reference member, the data creator determines, for each of the sensors, whether the sensor has obtained an appropriate image signal of the reference member,
   if all the sensors have obtained appropriate image signals, the data creator uses the appropriate image signals in creating the white correction data or the black correction data,
   if any of the sensors has obtained an inappropriate image signal, the data creator shifts the sensors in a sub-scanning direction orthogonal to the main-scanning direction, and causes the sensors to again obtain image signals of the reference member, and
   until the data creator determines that all the sensors have obtained appropriate image signals of the reference member, the data creator repeatedly shifts the sensors in the sub-scanning direction and causes the sensors to obtain image signals of the reference member.

7. The image reading apparatus according to claim 1, wherein
   the reference member has a black region, the data creator is configured to obtain the intermediate data by causing the sensors to obtain image signals of the black region irradiated with the light by the light source, and when the data creator obtains the intermediate data, the data creator causes the sensors to obtain image signals of the black region the plurality of times.

8. The image reading apparatus according to claim 1, wherein the reference member has a white region, the light source is configured to switch at least between light having a first luminous intensity and light having a second luminous intensity lower than the first luminous intensity, the data creator is configured to obtain the white data by causing the sensors to obtain image signals of the white region irradiated with the light having the first luminous intensity, and obtain the intermediate data by causing the sensors to obtain image signals of the white region irradiated with the light having the second luminous intensity, and at least one of when obtaining the white data and when obtaining the intermediate data, the data creator causes the sensors to obtain image signals of the white region the plurality of times.

9. The image reading apparatus according to claim 7, wherein the data creator obtains black data by causing the sensors to obtain image signals while the light source is emitting no light, and creates the black correction data based on the black data and the intermediate data.

10. The image reading apparatus according to claim 8, wherein the data creator obtains black data by causing the sensors to obtain image signals while the light source is emitting no light, and creates the black correction data based on the black data and the intermediate data.

* * * * *